(12) United States Patent
Guziec et al.

(10) Patent No.: US 12,351,191 B2
(45) Date of Patent: Jul. 8, 2025

(54) SYSTEMS AND METHODS FOR DETECTING VEHICLE MASS CHANGES

(71) Applicant: Allstate Insurance Company, Northbrook, IL (US)

(72) Inventors: Philip Guziec, Chicago, IL (US); Clayton Jeschke, Chicago, IL (US); Hongxuan Liu, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/857,520

(22) Filed: Jul. 5, 2022

(65) Prior Publication Data

US 2023/0159037 A1    May 25, 2023

Related U.S. Application Data

(63) Continuation of application No. 17/003,156, filed on Aug. 26, 2020, now Pat. No. 11,377,111.

(51) Int. Cl.
*G06F 7/70* (2006.01)
*B60W 40/13* (2012.01)
*G01G 19/08* (2006.01)

(52) U.S. Cl.
CPC ........... *B60W 40/13* (2013.01); *G01G 19/086* (2013.01); *B60W 2040/1392* (2013.01); *B60W 2400/00* (2013.01); *B60W 2520/105* (2013.01)

(58) Field of Classification Search
CPC ......... B60W 40/13; B60W 2040/1392; B60W 2400/00; B60W 2520/105; G01G 19/086
See application file for complete search history.

(56) References Cited

U.S. PATENT DOCUMENTS

| 5,973,273 A | 10/1999 | Tal et al. |
| 6,167,357 A * | 12/2000 | Zhu .................. G01G 19/086 |
| | | 702/175 |

(Continued)

FOREIGN PATENT DOCUMENTS

| CN | 202471205 U | 10/2012 |
| DE | 10244789 A1 | 4/2004 |
| EP | 2933614 A1 | 10/2015 |

OTHER PUBLICATIONS

Ghosh J., et al., "Vehicle Mass Estimation from CAN Data and Drivetrain Torque Observer," Published on Mar. 2017, Retrieved from URL: https://www.researchgate.net/publication/313693172, 9 Pages.

(Continued)

*Primary Examiner* — Adam M Alharbi
(74) *Attorney, Agent, or Firm* — Akerman LLP

(57) ABSTRACT

Methods, computer-readable media, software, and apparatuses include collecting, via one or more sensors and during a first window of time, sensor data associated with an acceleration of the vehicle, processing the sensor data to obtain frequency domain sensor data, analyzing the frequency domain sensor data to identify one or more occurrences of a vehicle mass change event, classifying a use of the vehicle for a shared mobility service during one or more time periods of the first window of time based on the one or more occurrences of a vehicle mass change, and transmitting, to a remote computing device, a notification relating to use of the vehicle for the shared mobility service.

20 Claims, 9 Drawing Sheets

(56) References Cited

U.S. PATENT DOCUMENTS

| | | | |
|---|---|---|---|
| 6,347,269 | B1 | 2/2002 | Hayakawa et al. |
| 6,839,615 | B2 | 1/2005 | Yanase |
| 7,363,116 | B2 | 4/2008 | Flechtner et al. |
| 7,899,594 | B2 | 3/2011 | Messih et al. |
| 8,798,887 | B2 | 8/2014 | Nickolaou et al. |
| 8,977,415 | B2 | 3/2015 | Tiberg |
| 9,028,354 | B2 | 5/2015 | Johnson et al. |
| 9,395,233 | B2 | 7/2016 | Dourra et al. |
| 10,274,360 | B2 | 4/2019 | Hall et al. |
| 11,466,997 | B1 * | 10/2022 | Williams ............... B64C 39/024 |
| 2013/0218412 | A1 * | 8/2013 | Ricci ................... G06F 11/2025 701/36 |
| 2013/0282238 | A1 * | 10/2013 | Ricci ..................... G06Q 10/00 701/99 |
| 2016/0355189 | A1 | 12/2016 | Lin et al. |
| 2017/0057316 | A1 | 3/2017 | Northrop et al. |
| 2018/0102001 | A1 | 4/2018 | Faust et al. |
| 2018/0245966 | A1 * | 8/2018 | Mittal .................... G01G 21/00 |
| 2019/0354903 | A1 * | 11/2019 | Seki ................... G06Q 30/0284 |
| 2020/0031358 | A1 * | 1/2020 | Lee ....................... B60W 50/00 |
| 2020/0200649 | A1 | 6/2020 | Ammoura et al. |
| 2021/0025715 | A1 * | 1/2021 | Benjamin .............. G06Q 50/40 |
| 2021/0213957 | A1 * | 7/2021 | Brown ............... G07C 9/00309 |

OTHER PUBLICATIONS

Tuladhar B.R., et al., "Estimating Passenger Loading on Train Cars Using Accelerometer," US Department of Transportation, arXiv:1808.00930v1 [eess.SP], Aug. 2, 2018, pp. 1-18.

* cited by examiner

SYSTEMS AND METHODS FOR DETECTING VEHICLE MASS CHANGES

CROSS-REFERENCE TO RELATED APPLICATIONS

The present application claims priority to U.S. patent application Ser. No. 17/003,156, filed on Aug. 26, 2020, which is incorporated by reference in its entirety herein.

TECHNICAL FIELD

Aspects of the disclosure generally relate to methods and computer systems, including one or more computers particularly configured and/or executing computer software and one or more sensors operably connected to the one or more computers. More specifically, aspects of this disclosure relate to systems and methods for analysis of sensor data obtained from a device within a vehicle, and detecting vehicle mass changes from the sensor data.

BACKGROUND

Although techniques exist to generally capture data from sensors on smartphones and in vehicles, they might not provide efficient methods of doing so. Further, these techniques may not reliably detect mass changes in a vehicle. Detecting mass changes in a vehicle, e.g., indicative of passenger entry or egress, may provide valuable information for a number of applications. For example, detection of such mass changes may be useful for controlling the operation of one or more vehicles of a shared mobility service, such as a rideshare service, car-share service, carpool service, peer to peer pickup service, parcel delivery service, and the like. Shared mobility services are becoming increasingly common as their applications continue to grow and improve. Despite advances in various technologies, however, it may be difficult to effectively identify when a vehicle is being used for a shared mobility service. Such effective identifying may be hampered by lack of data about drivers, and vehicles, such as when a new driver, or vehicle first joins a shared mobility service.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer-readable storage media, software, systems, and apparatuses for detection of vehicle mass changes and application of detected vehicle mass changes for identifying particular uses of vehicles. In particular, based on collected sensor data associated with a vehicle, a change in vehicle mass may be determined. Accordingly, based on one or more determined changes in vehicle mass, a shared mobility service use of the vehicle may be detected.

Advantageous solutions to the problems presented above, and other issues which will be apparent upon the reading of the present disclosure, may be to provide an apparatus that includes one or more sensors configured to measure an acceleration of a vehicle, one or more processors, and memory storing instructions that, when executed by the one or more processors, cause the apparatus to collect, via the one or more sensors and during a first window of time, sensor data associated with an acceleration of the vehicle, process the sensor data to obtain frequency domain sensor data, analyze the frequency domain sensor data to identify one or more occurrences of a vehicle mass change event, classify a use of the vehicle for a shared mobility service during one or more time periods of the first window of time based on the one or more occurrences of a vehicle mass change event, and transmit, to a remote computing device, a notification relating to use of the vehicle for the shared mobility service.

In some aspects, the one or more sensors may include at least one of: an on-board diagnostic accelerometer or a mobile computing device. Analyzing the frequency domain sensor data may include determining a change in resonant frequency of the vehicle. Determining the change in resonant frequency of the vehicle may include determining a resonant frequency of the vehicle before a vehicle stop and determining a resonant frequency of the vehicle after the vehicle stop. In some aspects, the memory may store additional computer-readable instructions that, when executed by the one or more processors, further cause the apparatus to categorize the one or more occurrences of a vehicle mass change as at least one of: a passenger entry into the vehicle, a passenger exit from the vehicle, a refueling of the vehicle, a package loading, or a package unloading. The notification may then include a description of the shared mobility service based on categorizing the one or more occurrences of a vehicle mass change. Classifying a use of the vehicle for a shared mobility service may include analyzing a series of the sensed vehicle stops during the first window of time and whether a vehicle mass change is associated with one or more sensed vehicle stops of the series of sensed vehicle stops.

In some aspects, the memory may store additional computer-readable instructions that, when executed by the one or more processors, further cause the apparatus to detect a baseline mass of the vehicle, the baseline mass of the vehicle relating to a mass of the vehicle without passengers or packages, and determine a resonant frequency associated with the baseline mass of the vehicle. Analyzing the frequency domain sensor data may then include determining a change in vehicle mass based on a change in resonant frequency. The one or more sensors may include a first sensor in a first region of the vehicle and a second sensor in a second location of the vehicle, and analyzing the frequency domain sensor data may include comparing sensor data of the first sensor to sensor data of the second sensor and determining a relative location of a mass change based on the comparing. In some aspects, the memory may store additional computer-readable instructions that, when executed by the one or more processors, further cause the apparatus to receive GPS data associated with the vehicle, and analyze the GPS data in combination with the sensor data to determine geo-locations of start and stop points of the vehicle during the first window of time. Classifying a use of the vehicle for a shared mobility service may then include analyzing the GPS data in combination with the sensor data.

In accordance with further aspects of the present disclosure, a method disclosed herein may include collecting, via one or more accelerometers and during a first window of time, accelerometer data associated with a vehicle, processing the accelerometer data to obtain frequency domain accelerometer data, analyzing a pattern of one or more occurrences of a vehicle mass change event to detect a use of the vehicle for a shared mobility service during one or more time periods of the first window of time, and transmitting, to a remote computing device, a notification relating to use of the vehicle for the shared mobility service during one or more time periods of the first window of time.

In some aspects, collecting accelerometer data associated with the vehicle may include collecting accelerometer data from at least one of an on-board diagnostic accelerometer or a mobile computing device. Analyzing the frequency domain accelerometer data may include determining a change in resonant frequency of the vehicle. Determining the change in resonant frequency of the vehicle may include determining a resonant frequency of the vehicle before a vehicle stop and determining a resonant frequency of the vehicle after the vehicle stop. In some aspects, the method may further include categorizing the one or more occurrences of a vehicle mass change as at least one of: a passenger entry into the vehicle, a passenger exit from the vehicle, a refueling of the vehicle, a package loading, or a package unloading. The notification may then include a description of the shared mobility service based on categorizing the one or more occurrences of a vehicle mass change. Classifying a use of the vehicle for a shared mobility service may include analyzing a series of the sensed vehicle stops during the first window of time and whether a vehicle mass change is associated with one or more sensed vehicle stops of the series of sensed vehicle stops.

In accordance with further aspects of the present disclosure, a system disclosed herein may include a first computing device associated with a vehicle and a second computing device in signal communication with the first computing device. The first computing device may include a processor, at least one accelerometer configured to measure a vibration of the vehicle, a wireless communication interface, and memory storing instructions that, when executed by the processor, cause the first computing device to measure, using the at least one accelerometer, a vibration of the vehicle. The second computing device may include a processor, and memory storing instructions that, when executed by the processor, cause the computing device to receive, from the first computing device and for a first window of time, sensor data associated with the vibration of the vehicle, process the sensor data to obtain frequency domain sensor data, analyze the frequency domain sensor data to identify one or more occurrences of a vehicle mass change event, classify a use of the vehicle for a shared mobility service during one or more time periods of the first window of time based on analyzing the one or more occurrence of a vehicle mass change, and displaying a notification relating to use of the vehicle for the shared mobility service.

In some aspects of the system, the at least one accelerometer may include at least one of: an on-board diagnostic accelerometer or a mobile computing device. Analyzing the frequency domain sensor data may include determining a change in resonant frequency of the vehicle. Determining the change in resonant frequency of the vehicle may include determining a resonant frequency of the vehicle before a vehicle stop and determining a resonant frequency of the vehicle after the vehicle stop. Classifying a use of the vehicle for a shared mobility service may include analyzing a series of the sensed vehicle stops during the first window of time and whether a vehicle mass change is associated with one or more sensed vehicle stops of the series of sensed vehicle stops.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
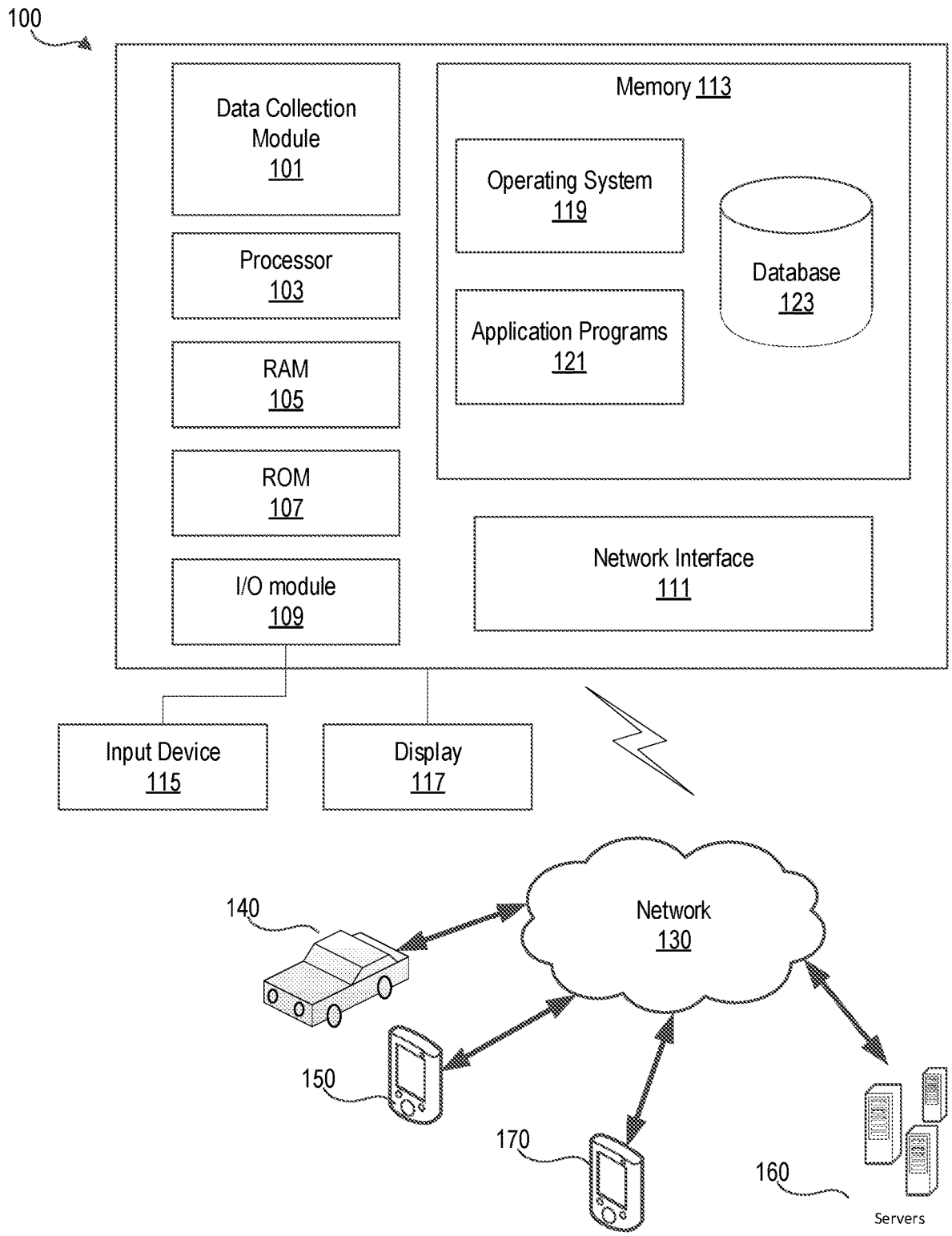
FIG. 1 is an example network environment and computing systems that may be used in accordance with one or more aspects described herein.

In accordance with various aspects of the disclosure, methods, computer-readable media, software, and apparatuses are disclosed for detecting mass changes of a vehicle, e.g., before and after a stop, and determine whether such mass changes are indicative of entry or egress of a passenger or the loading or unloading of a package. As described herein, identification of a use of the vehicle for mobility sharing services may be facilitated using detected vehicle mass changes.

According to aspects of the present disclosure, an accelerometer sensor system in a vehicle may be employed to analyze the accelerometer signal during a stop, or before and after a stop. More specifically, frequency analysis of the accelerometer signal may be used to determine the change in mass of the vehicle. Detected changes in mass of the vehicle may then be used to determine a number of passengers in the vehicle before and after a stop, fuel loading of the vehicle during the stop, package load change during the stop, and the like. A pattern of one or more changes in mass of the vehicle may be used to determine a shared mobility service use of the vehicle.

The accelerometer sensor system in the vehicle may include an on board diagnostic accelerometer and/or an accelerometer in a mobile computing device. Frequency analysis of the accelerometer sensor system may be used to determine a resonant frequency change, or a change in transfer function between the road and the vehicle before and after a stop. A change in resonant frequency may be indicative of passengers entering or exiting the vehicle, fuel being added to the vehicle, packages being loaded or loaded into the vehicle, and the like. Detection of such occurrences may be used for detection of shared mobility use cases.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

In one or more arrangements, aspects of the present disclosure may be implemented with a computing device. FIG. 1 illustrates a block diagram of an example computing environment including vehicle mass analysis system 100 (also referred to herein as a vehicle mass change detection device) that may be used in accordance with one or more aspects described herein. The vehicle mass analysis system 100 may be a computing device, such as a personal computer (e.g., a desktop computer), server, laptop computer, notebook, tablet, smartphone, etc. The vehicle mass analysis system 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), field programmable gate arrays (FPGA), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, vehicle mass analysis system 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the vehicle mass analysis system 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the vehicle mass analysis system 100 may provide input data, and may also include one or more of a speaker for providing audio output and a video display device for providing textual, audiovisual and/or graphical output. The I/O module 109 may also be configured to be connected to a display device 117, such as a monitor, television, touchscreen, etc., and may include a graphics card. For example, the I/O module 109 may be configured to receive biometric data from a user. The display device 117 and input device 115 are shown as separate elements from the vehicle mass analysis system 100; however, they may be within the same structure. On some vehicle mass analysis systems 100, the input device 115 may be operated by a driver of a vehicle to interact with the data collection module 101, including providing information about vehicle information, driver preferences, driver information, account information, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the vehicle mass analysis system 100 to perform various functions. For example, memory 113 may store software used by the vehicle mass analysis system 100, such as an operating system 119 and application programs 121, and may include an associated database 123.

Software may be stored within memory 113 and/or may provide instructions to processor 103 for enabling the vehicle mass analysis system 100 to perform various functions described herein. For example, memory 113 may store software used by vehicle mass analysis system 100, such as an operating system 119, application programs 121, and an associated internal database 123. Processor 103 and its associated components may allow the vehicle mass analysis system 100 to execute a series of computer-readable instructions to transmit or receive sensor data, analyze sensor data, detect vehicle mass changes, and issue notifications and/or alerts as described herein.

Although not shown in FIG. 1, various elements within memory 113 or other components in the vehicle mass analysis system 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 160 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 160. These types of caches and others may be included in various embodiments, and may provide potential advantages in certain implementations of retrieving and analyzing driving data, such as faster response times and less dependence on network conditions when transmitting/receiving driving data from a vehicle 140 (e.g., from vehicle-based devices such as on-board vehicle computers, short-range vehicle communication systems, telematics devices), data from one or more enterprise servers 160, etc.

The network interface 111 may allow vehicle mass analysis system 100 to connect to and communicate with a network 130. The network 130 may be any type of network, including a local area network (LAN) and/or a wide area network (WAN), such as the Internet, a cellular network, or satellite network. Through network 130, vehicle mass analysis system 100 may communicate with one or more other computing devices such as a user device 150 (e.g., laptops, notebooks, smartphones, tablets, personal computers, servers, vehicles, home management devices, home security devices, smart appliances, etc.) associated with a driver of vehicle 140. Through network 130, vehicle mass analysis system 100 may communicate with one or more mobile computing devices 170 (e.g., smartphones, smart terminals, tablets, and the like). In some examples, mobile computing devices 170 may include vehicular-based computing devices or other devices positioned in a vehicle. Through network 130, vehicle mass analysis system 100 may also communicate with one or more enterprise servers 160 to exchange related information and data.

Network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 111 may use various protocols, including TCP/IP, Ethernet, File Transfer Protocol (FTP), Hypertext Transfer Protocol (HTTP), etc., to communicate with user device 150, mobile computing device 170, and enterprise servers 160.

It will be appreciated that the network connections shown are illustrative and other means of establishing a communications link between the computers may be used. The existence of any of various network protocols such as Transmission Control Protocol/Internet Protocol ("TCP/IP"), Ethernet, File Transfer Protocol ("FTP"), Hypertext Transfer Protocol ("HTTP") and the like, and of various wireless communication technologies such as the Global System for Mobile Communications ("GSM"), Code Division Multiple Access ("CDMA"), Wi-Fi, Long-Term Evolution ("LTE"), and Worldwide Interoperability for Microwave Access ("WiMAX"), is presumed, and the various computing devices and mobile device location and configuration system components described herein may be configured to communicate using any of these network protocols or technologies.

The vehicle mass analysis system 100 may operate in a networked environment supporting connections to one or more remote computers, such as user device 150 and mobile computing device 170. The vehicle mass analysis system 100, and related user device 150 and mobile computing device 170, may be in signal communication with special-purpose devices installed in vehicles, other mobile devices that may travel within vehicles, or devices outside of vehicles that are configured to receive and process sensor data. Thus, the vehicle mass analysis system 100 and user device 150 and mobile computing device 170 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the vehicle mass analysis system 100.

The network connections depicted in FIG. 1 may include a local area network (LAN) and a wide area network (WAN), and a wireless telecommunications network, but may also include other networks. When used in a LAN networking environment, the vehicle mass analysis system 100 may be connected to the LAN through a network interface or adapter. When used in a WAN networking environment, the vehicle mass analysis system 100 may include a modem or other means for establishing communications over the WAN, such as network 130 (e.g., the Internet). When used in a wireless telecommunications network, such as network 130, the vehicle mass analysis system 100 may include one or more transceivers, digital signal processors, and additional circuitry and software for communicating with user device 150 and mobile computing device 170 (e.g., mobile phones, short-range vehicle communication systems, vehicle telematics devices) via one or more network devices (e.g., base transceiver stations) in the wireless network 130.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Although not shown in FIG. 1, a security and integration layer may be provided as part of vehicle mass analysis system 100, through which communications may be sent and managed between devices of the vehicle mass analysis system 100 (e.g., a user's personal mobile device, a vehicle-based system, external server, etc.) and/or other remote devices and remote networks. The security and integration layer may comprise one or more separate computing devices, such as web servers, authentication servers, and/or various networking components (e.g., firewalls, routers, gateways, load balancers, etc.), having some or all of the elements described above with respect to the vehicle mass analysis system 100. As an example, a security and integration layer of a mobile computing device, vehicle-based device, or a server operated by an insurance provider, financial institution, governmental entity, or other organization, may comprise a set of web application servers configured to use secure protocols and to insulate the vehicle mass analysis system 100 from external. In some cases, the security and integration layer may correspond to a set of dedicated hardware and/or software operating at the same physical location and under the control of same entities as the vehicle mass analysis system 100. For example, the security and integration layer may correspond to one or more dedicated web servers and network hardware in an organizational datacenter or in a cloud infrastructure supporting a cloud-based mobile device location and configuration system. In other examples, the security and integration layer may correspond to separate hardware and software components which may be operated at a separate physical location and/or by a separate entity.

As discussed below, the data transferred to and from various devices in the vehicle mass analysis system 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored on in a database or other storage in a mobile device, analysis server, or other computing devices in the vehicle mass analysis system 100, by using a security and integration layer to authenticate users and restrict access to unknown or unauthorized users. In various implementations, security and integration layer may provide, for example, a file-based integration scheme or a service-based integration scheme for transmitting data between the various devices in the vehicle mass analysis system 100. Data may be transmitted through the security and integration layer, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the vehicle mass analysis system 100 and/or the security and integration layer. The web services may be accessed by authorized external devices and users to support input, extraction, and manipulation of the data (e.g., driving data, location data, confidential personal data, etc.) between the vehicle mass analysis system 100 and other devices, such as user device 150 or mobile computing device 170. Web services built to support the vehicle mass analysis system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer using the Secure Sockets Layer (SSL) or Transport Layer Security (TLS) protocol to provide secure connections between servers (e.g., data collection module 101) and various other devices (e.g., user device 150 and mobile computing device 170, data analysis servers, etc.). SSL or TLS may use HTTP or HTTPS to provide authentication and confidentiality.

In other examples, such web services may be implemented using the WS-Security standard, which provides for secure SOAP messages using XML, encryption. In still other examples, the security and integration layer may include specialized hardware for providing secure web services. For example, secure network appliances in the security and integration layer may include built-in features such as hardware-accelerated SSL and HTTPS, WS-Security, and firewalls. Such specialized hardware may be installed and configured in the security and integration layer in front of the web servers, so that any external devices may communicate directly with the specialized hardware.

Although not shown in FIG. 1, various elements within memory 113 or other components in the vehicle mass analysis system 100, may include one or more caches, for example, CPU caches used by the processor 103, page caches used by the operating system 119, disk caches of a hard drive, and/or database caches used to cache content from database 123. For embodiments including a CPU cache, the CPU cache may be used by one or more processors 103 to reduce memory latency and access time. In such examples, a processor 103 may retrieve data from or write data to the CPU cache rather than reading/writing to memory 113, which may improve the speed of these operations. In some examples, a database cache may be created in which certain data from a database 123 (e.g., a driving data database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving and analyzing fused sensor data, such as faster response times and less dependence on network conditions when transmitting/receiving fused sensor data, vehicle data, occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 121 may be used by the vehicle mass analysis system 100 (e.g., vehicle mass detection software applications, and the like), including computer executable instructions for receiving and storing data from sensors of mobile devices, and/or vehicle-based systems, analyzing the sensor data to determine whether there is an occurrence of a change in vehicle mass, issuing notifications regarding the change in vehicle mass, and/or performing other related functions as described herein.

Figure 2:
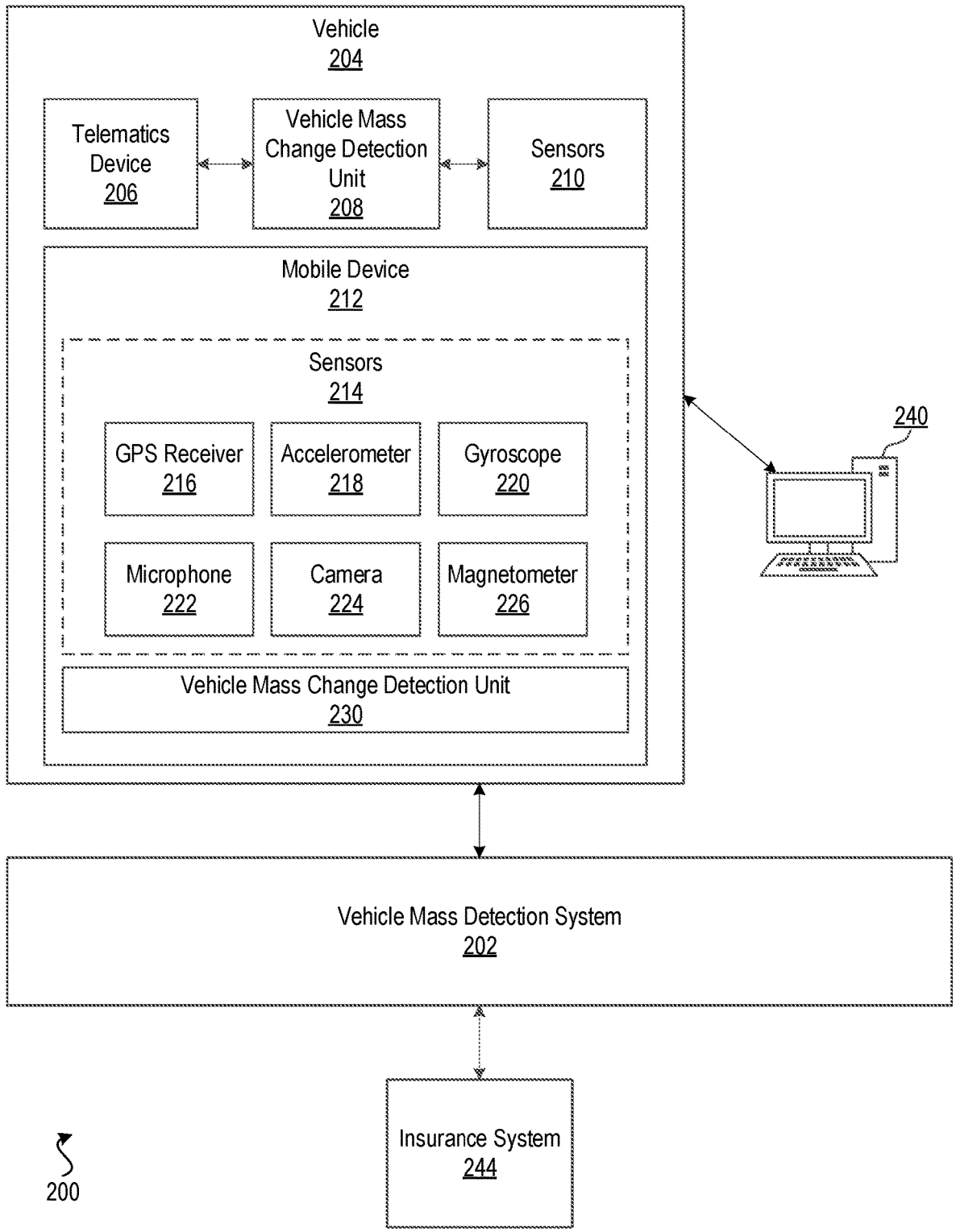
FIG. 2 is a block diagram illustrating various components and devices associated with an example vehicle mass analysis system, in accordance with one or more aspects described herein.

FIG. 2 is an illustration of an example implementation of a vehicle mass analysis system 200. The vehicle mass analysis system 200 may be similar to and/or may include some or all of the components of the vehicle mass analysis system 100 in FIG. 1. The vehicle mass analysis system 200, in this example, includes a vehicle mass detection system 202. The vehicle mass detection system 202, described in further detail below, detects characteristics of a vehicle over time that may be indicative of a mass change of a vehicle. The vehicle mass detection system 202 may be similar to and/or may include some or all of the components of the vehicle mass analysis system 100 in FIG. 1. In some examples, the vehicle mass detection system 202 may detect a change in vehicle mass based on changes in resonant frequency of the vehicle, determined via sensor data (e.g., accelerometer data) received from one or more mobile devices associated with the vehicle or one or more vehicle-based devices. The sensor data may include raw sensor data received from one or more sensors of a mobile device 212 and/or a vehicle 204, derived sensor data (e.g., outputs from statistical computations on raw sensor data), and/or processed data (e.g., outputs from smoothing algorithms applied on the raw sensor data and/or the derived data). In some examples, additional sensor data may be received that may be associated with operation of a vehicle with respect to, e.g., accelerating, decelerating, braking, turning, signaling, lane usage, adequate vehicle spacing, speed, distraction management, and other driving-related operations performed by a driver of the vehicle as captured by sensors of, for example, a mobile device (e.g., a mobile device on board or associated with the vehicle). Collectively, the data may be referred to as received sensor data. In some arrangements, the mobile device may be in signal communication with the vehicle or various systems or components of the vehicle, the vehicle mass detection system 202, and one or more external systems (e.g., an insurance system 244).

The example vehicle mass analysis system 200 may contain some or all of the hardware/software components as the vehicle mass analysis system 100 depicted in FIG. 1. The vehicle mass detection system 202 may include a special-purpose computing device that is configured to receive sensor data (e.g., raw sensor data, signals and the like) from a mobile device 212 located within a vehicle 204. The vehicle mass detection system 202 may initiate communication with, retrieve data from, or receive raw sensor data (e.g., signals) from one or more sensors 214 within a mobile device 212 wirelessly over one or more computer networks (e.g., the Internet), where the mobile device 212 is located within a vehicle 204. The vehicle mass detection system 202 may also be configured to receive driving data from a vehicle 204 wirelessly via telematics devices 206, or by way of separate computing systems (e.g., computer 240) over one or more computer networks (e.g., the Internet). The vehicle mass detection system 202 may also be configured to receive vehicle data (e.g., make, model, vehicle identification number, vehicle weight, vehicle size parameters, vehicle passenger capacity, etc.) from one or more external vehicle databases or sources. Further, the vehicle mass detection system 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the vehicle mass analysis system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or secured to a vehicle, for instance, in the cabins of a vehicle. The mobile device 212 may include a set of mobile device sensors 214, which may include, for example, a GPS receiver 216, an accelerometer 218, a gyroscope 220, a microphone 222, a camera 224, and a magnetometer 226. The mobile device sensors 214 may be capable of detecting and recording various conditions at the mobile device 212 and operational parameters of the mobile device 212. For example, sensors 214 may detect and store data corresponding to the mobile device's location (e.g., GPS coordinates), speed and direction in one or multiple axes (forward and back, left and right, and up and down for example), rates of acceleration or deceleration, specific instances of sudden acceleration, deceleration, and lateral movement, and other data which may be indicative of a vehicle braking event, a vehicle stop, an idling event, and the like. Additional sensors 214 may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on mobile device 212 may be configured to detect certain driving data independently using mobile device sensors 214. For example, mobile device 212 may be equipped with sensors 214, such as a GPS receiver 216, an accelerometer 218, a gyroscope 220, a microphone 222, a camera 224, and/or a magnetometer 226, and may determine vehicle location, speed, acceleration/deceleration, direction and other basic driving data without needing to communicate with the vehicle sensors 210, or any vehicle system. In other examples, software on the mobile device 212 may be configured to receive some or all of the driving data collected by vehicle sensors 210.

Additional sensors 214 may detect and store external conditions. For example, audio sensors and proximity sensors 214 may detect other nearby mobile devices, traffic levels, road conditions, traffic obstructions, animals, cyclists, pedestrians, and other conditions that may factor into a braking event data analysis.

Data (e.g., raw data or signal) collected by the mobile device sensors 214 may be stored, processed, and/or analyzed within the mobile device 212, and/or may be transmitted to one or more external devices for processing, analysis, and the like. For example, as shown in FIG. 2, raw sensor data, signals, etc. collected by the mobile device sensors 214 may be transmitted to a vehicle mass detection system 202. In some examples, the data collected by the mobile device sensors 214 may be stored, processed, and/or analyzed at the vehicle 204 by an on-board computing device in the vehicle or by the mobile device 212, and/or may be transmitted to one or more external devices (e.g., an insurance system 240). For example, sensor data may be exchanged (uni-directionally or bi-directionally) between vehicle 204 and mobile device 212.

Data may be transmitted between the mobile device 212 and the vehicle 204 via wireless networks, including those discussed above, or short-range communication systems. Short-range communication systems are data transmission systems configured to transmit and receive data between nearby devices. In this example, short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM infrared, IEEE 802.11, WiMAX, RFID, and/or any suitable wireless communication media, standards, and protocols. In certain systems, short-range communication systems may include specialized hardware installed in vehicle 204 and/or mobile device 212 (e.g., transceivers, antennas, etc.), while in other examples the communication systems may be implemented using existing hardware components (e.g., radio and satellite equipment, navigation computers) or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle for which vehicle mass change events may be detected. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rates of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, in some examples, the vehicle mass detection system 202 may acquire information about the vehicle 204 directly from the vehicle 204.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 204, and/or locational sensors or devices external to the vehicle 204 may be used determine the route, trip type (e.g., commute, errand, new route, etc.), lane position, and other vehicle position or location data.

The data collected by the vehicle sensors 210 may be stored or analyzed within the respective vehicle 204 by an on-board computing device or mobile device 212, or may be transmitted to one or more external devices. For example, as shown in FIG. 2, raw sensor data may be transmitted to a vehicle mass detection system 202, which may be a collection of special-purpose computing devices that are interconnected and in signal communication with each other. The special-purpose computing devices may be programmed with a particular set of instructions that, when executed, perform functions associated processing the raw sensor data to detect vehicle mass and generate and/or issue notifications to one or more entities regarding detected mass changes for a window of time. As such, a vehicle mass detection system 202 may be a separate special-purpose computing device or may be integrated into one or more components within the vehicle 204, such as the telematics device 206, or in the internal computing systems (e.g., on-board vehicle computing device) of the vehicle 204. Additionally, the sensor data may be transmitted as vehicle telematics data via a telematics device 206 to one or more remote computing devices, such as a vehicle mass detection system 202. A telematics device 206 may be a computing device containing many or all of the hardware/software components as the vehicle mass analysis system 100 depicted in FIG. 1. As discussed above, the telematics device 206 may receive vehicle telematics data from vehicle sensors 210, and may transmit the data to one or more external computer systems (e.g., an insurance system 244) over a wireless network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204. The telematics device 206 also may collect information regarding the vehicle's location, driver's route choice, whether the driver follows a given route, as part of classifying a type of trip (e.g. commute, errand, new route, gig drive etc.).

In the example shown in FIG. 2, the telematics device 206 may receive vehicle telematics data from vehicle sensors 210, and may transmit the data to a vehicle mass detection system 202. However, in other examples, one or more of the vehicle sensors 210 may be configured to transmit data directly to a vehicle mass detection system 202 without using a telematics device 206. For instance, a telematics device 206 may be configured to receive and transmit data from certain vehicle sensors 210, while other sensors may be configured to directly transmit data to a vehicle mass detection system 202 without using the telematics device 206. Thus, telematics devices 206 may be optional in certain embodiments.

In certain embodiments, the mobile device 212 within the vehicle 204 may be programmed with instructions to collect vehicle telematics data from the telematics device 206 or from the vehicle sensors 210, and then to transmit the vehicle telematics data to the vehicle mass detection system 202 and other external computing devices. For example, the mobile device 212 may transmit the vehicle telematics data directly to a vehicle mass detection system 202, and thus may be used in conjunction with or instead of the telematics device 206. Moreover, the processing components of the mobile device 212 may be used to collect and analyze vehicle telematics data to detect vehicle mass change events, issue notifications regarding vehicle mass change events, and perform other related functions. Therefore, in certain embodiments, the mobile device 212 may be used in conjunction with or instead of the vehicle mass change detection unit 208.

The vehicle 204 may include a vehicle mass change detection unit 208, which may be a separate computing device or may be integrated into one or more other components within the vehicle 204, such as the telematics device 206, the internal computing systems of the vehicle 204, and/or the mobile device 212. In some examples, the mobile device 212 may include a vehicle mass change detection unit 230 which may be a device separate and independent from the vehicle mass change detection unit 208 of the vehicle 204. The vehicle mass change detection units 208 and 230 may alternatively be implemented by computing devices separate and independent from the vehicle 204 and the mobile device 212, such as one or more computer systems 240. In any of these examples, the vehicle mass change detection units 208 and 230 may contain some or all of the hardware/software components as the vehicle mass analysis system 100 depicted in FIG. 1.

The vehicle mass change detection units 208 and 230 may be implemented in hardware and/or software configured to receive raw sensor data from the vehicle sensors 210 and the mobile device sensors 214 respectively, and/or other vehicle telematics data sources. The vehicle mass change detection unit 208 may further be configured to receive raw sensor data from a telematics device 206. After receiving the raw sensor data and vehicle telematics data, the vehicle mass change detection units 208 and 230 may process the raw data and/or analyze the raw sensor data and vehicle telematics data to determine whether a change in vehicle mass (e.g., a change of a sufficient size) occurred during a particular window of time. One or more notifications may be generated based on the determination and/or transmitted to one or more external computing devices. For example, the vehicle mass change detection units 208 and 230 may analyze the sensor data collected from the mobile sensors 214 and the vehicle sensors 210. The vehicle mass change detection units 208 and 230 may then apply machine learning algorithms to the collected sensor data to determine whether a particular window of time should be classified as having a vehicle mass change event. In examples where a window of time is classified as a vehicle mass change event, the vehicle mass change detection units 208 and 230 may transmit such information to one or more external computing devices.

Further, in certain implementations, the functionality of the vehicle mass change detection units 208 and 230, such as collecting and analyzing sensor data to detect vehicle mass change events, and transmitting notifications to external computing devices regarding the detected vehicle mass change events, may be performed in a vehicle mass detection system 202 rather than by the individual vehicle 204 or mobile device 212. In such implementations, the vehicle 204 or mobile device 212 may only collect and transmit sensor data to a vehicle mass detection system 202, and thus the vehicle mass change detection units 208 and 230 may be optional. Thus, in various examples, the analyses and actions performed within the vehicle mass change detection units 208 and 230 may be performed entirely within the vehicle mass change detection units 208 and 230, entirely within the vehicle mass detection system 202, or in some combination of the two. For instance, the vehicle mass change detection units 208 and 230 may continuously receive and analyze sensor data and determine whether the sensor data indicates a change in vehicle mass is above one or more predefined thresholds. While the changes in vehicle mass are below the predefined threshold (i.e., there is minimal likelihood of a vehicle mass change event), the vehicle mass change detection units 208 and 230 may continue to receive and analyze data, such that large or repetitive amounts of data need not be transmitted to the vehicle mass detection system 202. However, upon detecting a change in resonant frequency above the predefined threshold, the vehicle mass change detection units 208 and 230 may transmit the sensor data to the vehicle mass detection system 202, such that the vehicle mass detection system 202 may apply machine learning algorithms to determine whether a vehicle mass change event has occurred. In these examples, the vehicle mass change detection units 208 and 230 may control the type of data and the amount of data transmitted to the vehicle mass detection system 202 for processing.

Detailed descriptions and examples of the analyses that may be performed by the vehicle mass detection units 208 and 230 and/or by the vehicle mass detection system 202 are described below.

Figure 3:
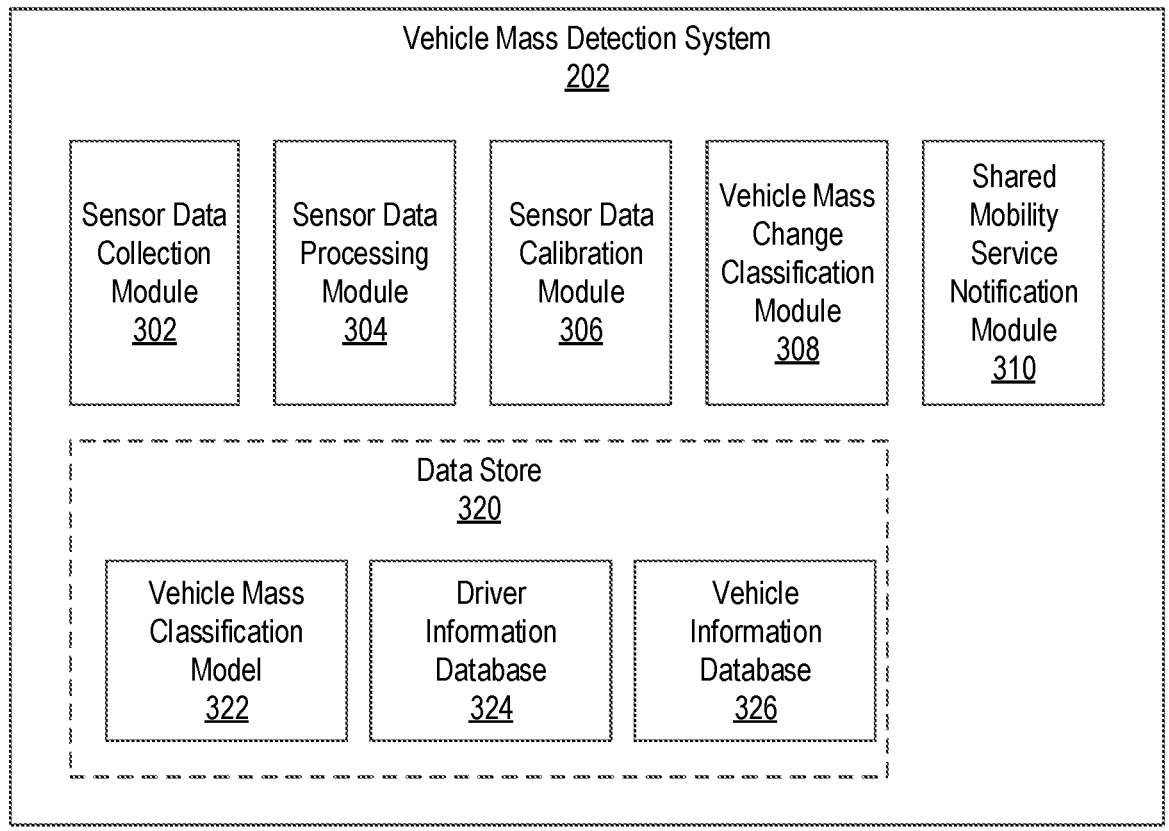
FIG. 3 is a block diagram of an example of an implementation of a vehicle mass analysis system, in accordance with one or more aspects described herein.

FIG. 3 shows an example implementation of a vehicle mass detection system 202. In some example implementations, the vehicle mass detection system 202 is a special-purpose computing device programmed with instructions, that when executed, perform functions associated with collecting or receiving raw sensor data from mobile devices and vehicles during a window of time, processing the raw sensor data, determining whether a vehicle mas change event likely occurred during the window of time, and generating and/or issuing notifications to one or more external computing systems. In these example implementations, the units 302-310 of the vehicle mass detection system 202 correspond to particular sets of instructions embodied as software programs residing at the vehicle mass detection system 202. In other example implementations, the vehicle mass detection system 202 is a collection of special-purpose computing devices that are interconnected and in signal communication with each other. In these examples, each unit or device 302-310 of the vehicle mass detection system 202 respectively corresponds to a special-purpose computing device programmed with a particular set of instructions, that, when executed, perform respective functions associated with collecting sensor data from mobile devices and vehicles during a window of time, processing the sensor data, determining whether a vehicle mass change event likely occurred during the window of time, detecting shared mobility application uses of the vehicle based on determined vehicle mass change events, and issuing notifications regarding detected shared mobility application uses. Such special-purpose computing devices may be, for example, application servers programmed to perform the particular set of functions.

The vehicle mass detection system 202, in this example, includes various modules, units and databases that facilitate collecting and processing raw sensor data during a window of time, determining whether a vehicle mass change event occurred during the window of time, and issuing notifications to external computing systems where a vehicle mass change event or series of events has been detected. It will be appreciated that the vehicle mass detection system 202 illustrated in FIG. 3 is shown by way of example, and that other implementations of a vehicle mass detection system may include additional or alternative modules, units, devices, and/or databases without departing from the scope of the claimed subject matter. In this example, the vehicle mass detection system 202 includes a sensor data collection module 302, a sensor data processing module 304, a sensor data calibration module 306, a vehicle mass change classification module 308, a shared mobility service notification module 310, and a data store 320. Each module may include hardware and/or software configured to perform various functions within the vehicle mass detection system 202. Further, each module may be a separate and distinct computing device or one or more modules may be integrated into a single computing device.

The vehicle mass detection system 202 may train a shared mobility service notification module 310 for detecting a shared mobility application associated with an interval of driving data using a variety of factors including driving conditions data, mobility status data, driving data, trips data, passenger presence data, driver information data, history data, visited points of interest, and/or audio, video, and/or wireless signals captured by a mobile device 212 for a driver or a passenger of the vehicle. For example, shared mobility service notification module 310 may additionally consider how safely a driver was driving in various conditions, such as with or without passengers, during certain weather conditions, during certain road conditions, during the day versus at night, near points of interest, and in other such conditions. The indicators of safety may include accident data, tickets, license suspensions and/or cancellations, the cost of insuring a driver, and the like. In some embodiments, shared mobility service notification module 310 may be trained to output a value indicating an estimated shared mobility service insurance premium (e.g., in dollars) over a given period (e.g., monthly). Additionally or alternatively, shared mobility service notification module 310 may be trained to output a discrete value indicating, for example, an estimated range of an insurance premium (e.g., in dollars) over a given period (e.g., monthly). For example, shared mobility service notification module 310 may classify a driver or rider into one of several discrete insurance premium ranges.

The data store 320 may store information relating to the determination of whether sensor data represents a vehicle mass change event, information relating to the driver of the vehicle 204, information relating to the mobile device 212, information relating to one or more passengers of the vehicle, and information relating to one or more additional mobile devices in the vehicle. For example, the data store 320 may include a vehicle mass classification model 322, a driver information database 324, and a vehicle information database 326. It will be appreciated that in other examples, the data store 320 may include additional and/or alternative databases.

In an example, the vehicle mass classification model 322 may store information relating to one or more classification machine learning algorithms, including random forest, k-means clustering, neural network, support vector machine, etc. The classification machine learning algorithms may be used by the vehicle mass detection system 202 to determine whether or not sensor data collected during or representing a particular window of time likely represents a vehicle mass change event. As such, the classification machine learning algorithms may classify a window of time into 2 classes: a likely vehicle mass change event, and an unlikely vehicle mass change event. A classification machine learning algorithm may be based on various features relating to the sensor data. The features may include sensor data collected from the mobile sensors 214, the vehicle sensors 210, and any other vehicle telematics data. The features may also include data derived by performing statistical calculations (e.g., calculating a maximum value, minimum value, standard deviation, variance, absolute value, mean, median, etc.) or post-processing (e.g., reducing redundancies, reducing noise, etc.) on the sensor data collected from the mobile sensors 214, the vehicle sensors 210, and any other vehicle telematics data. In some examples, the features used by the classification machine learning algorithm may have different levels of importance, such that some features are more indicative of a likely vehicle mass change event than others. Accordingly, the classification machine learning algorithm may assign various weights to the features.

The driver information database 324 may store information associated with drivers of the vehicles 204 (e.g., name of driver, vehicle identification, one or more associated mobile devices, etc.). In some examples, the driver information database 324 may also store the driver's affiliation with one or more insurance companies. Similarly, the vehicle information database 326 may store information associated with the vehicle 204 (e.g., vehicle make and model, vehicle identification number, the vehicle's association with one or more insurance companies, etc.).

Figure 4:
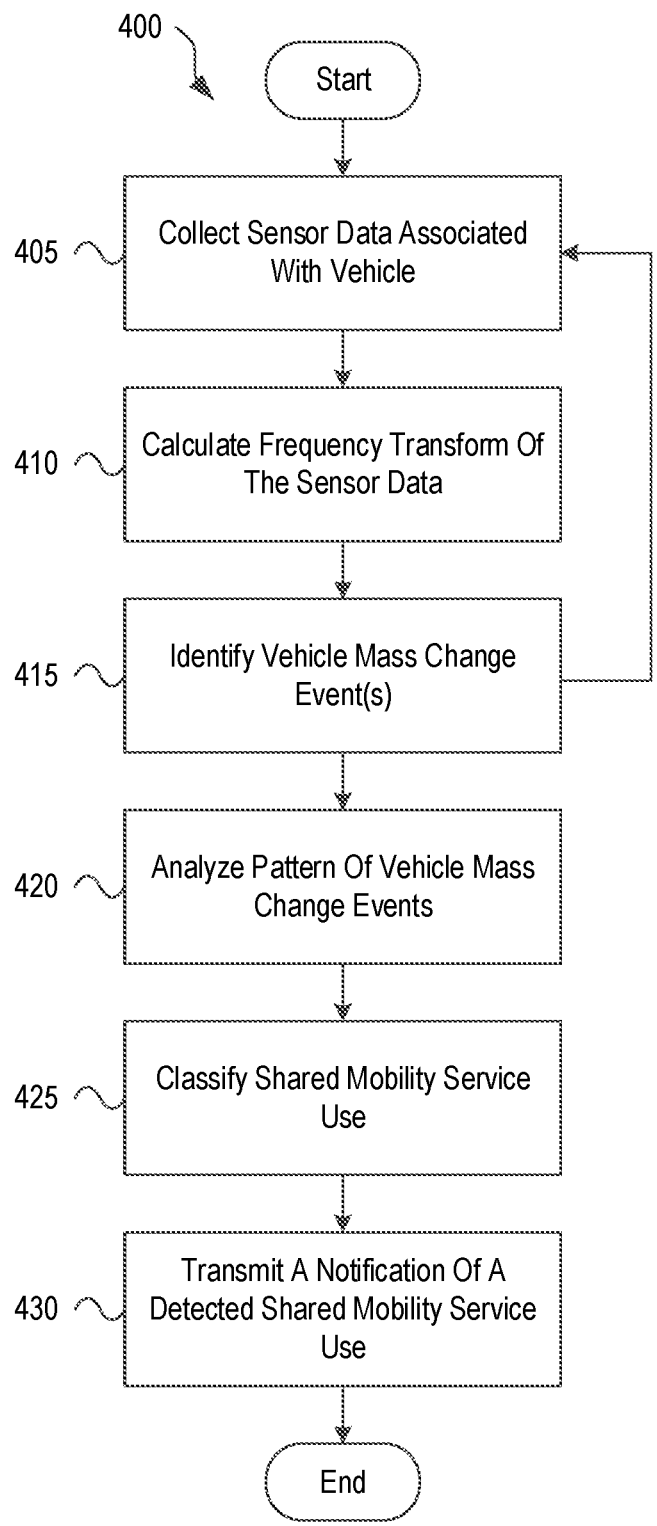
FIG. 4 is a flowchart of example method steps for receiving and analyzing vehicle sensor data, detecting one or more vehicle mass change events, and issuing a notification based on the detection, in accordance with one or more aspects described herein.

FIG. 4 is a flowchart 400 of example steps for receiving and analyzing vehicle sensor data, detecting one or more vehicle mass change events, and issuing a notification based on the detection. The vehicle mass detection system 202 and/or the vehicle mass change detection unit 230 and/or the vehicle mass change detection unit 208 may be used to perform these method steps of flowchart 400. At step 405, sensor data associated with an acceleration of a vehicle is collected via one or more sensors and during a first window of time. In some examples, the one or more sensors may include an on-board diagnostic accelerometer that is equipped with the vehicle. In some examples, the one or more sensors may include a mobile computing device accelerometer. The sensor data may comprise acceleration data in one or more directions, such as a vertical direction. In some examples, the sensor data may comprise acceleration data in one or more directions to provide acceleration data pertaining to the roll, pitch, and yaw of the vehicle. In some examples, the one or more sensors may operate to provide sensor data regardless of a position of the one or more sensors relative to the vehicle, e.g., to provide a sensed vertical acceleration of the vehicle.

Figure 6:
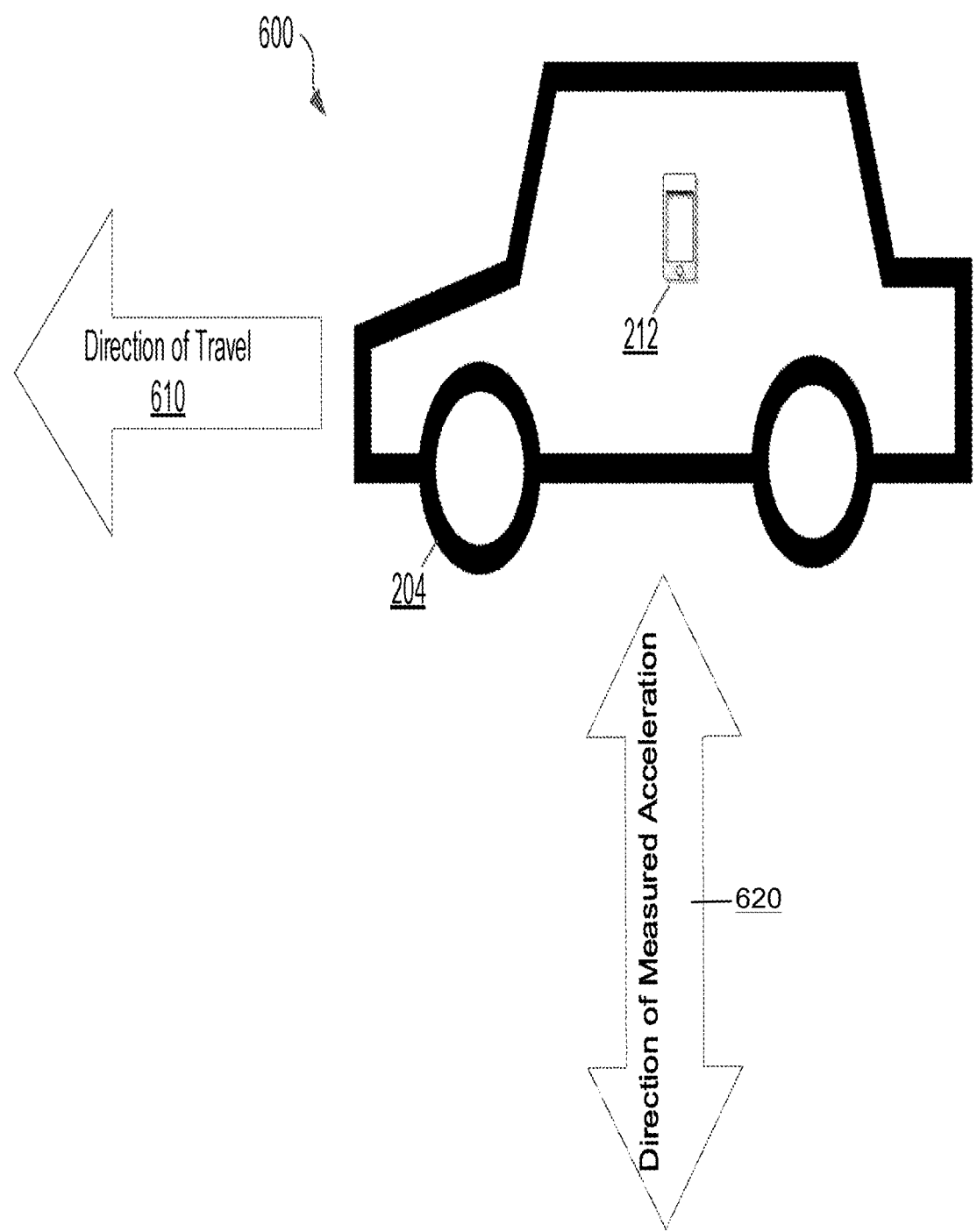
FIG. 6 illustrates various aspects of a vehicle and a mobile device therein used to detect a vehicle mass change, in accordance with one or more aspects described herein.

In some examples, the sensor data calibration module 306 may perform an alignment of the sensor data based on the axes of the mobile device 212 and the reference frame of the vehicle 204 (e.g., translate the first, second, and third axes of the sensor data into an x-axis, y-axis, and z-axis). In certain embodiments, the sensor data calibration module 306 may perform the alignment based on gravity. In other words, the sensor data calibration module 306 may use gravity to determine an orientation of the mobile device 212 within the vehicle 204. FIG. 6 shows various aspects of a vehicle 204 and a mobile device 212 therein used to align sensor data from the mobile device 212 to a reference frame of the vehicle 204. As shown in FIG. 6, the sensor data calibration module 306 may transform the sensor data such that the z-axis of the sensor data associated with the mobile device 212 is the direction of measured acceleration 620 (e.g., a direction aligned with the direction of gravity, or in other words a vector indicating acceleration due to gravity), and the x-axis of the sensor data associated with the mobile device 212 is aligned with the direction of travel 610. To determine the x-axis based on the sensor data, the sensor data calibration module 306 may determine along which axis the maximum speed and acceleration take place. In particular, the sensor data calibration module 306 may analyze the sensor data to detect large magnitudes of movement (e.g., speed, acceleration, rotational movement, etc.) along an axis, and infer that this axis corresponds to the x-axis of the reference frame of the vehicle 204. In these examples, the y-axis is the remaining axis.

At step 405, in addition to or instead of obtaining the sensor data from the sensors 214 of the mobile device 212, the vehicle mass detection system 202 may collect and process sensor data from the sensors 210 of the vehicle 204. In certain embodiments, the sensor data from the sensors 210 of the vehicle 204 may be used to supplement the sensor data from the sensors 214 of the mobile device 212. The additional data may be beneficial in providing increased certainty in detecting vehicle mass change events. For example, where the sensor data from the sensors 214 of the mobile device 212 contain too much noise (e.g., due to movement of the mobile device 212 within the vehicle 204), or signal communication with the mobile device 212 is lost, the vehicle mass detection system 202 (and/or the vehicle mass change detection unit 208 and/or the vehicle mass change detection unit 230) may collect and process sensor data from the sensors 210 of the vehicle 204. The vehicle mass detection system 202 may implement similar methods to those described above with respect to sensor data obtained from the sensors 214 of the mobile device 212. In these examples, the sensor data from the sensors 210 may also be used to perform an alignment of the sensor data based on the axes of the mobile device 212 instead of relying on the direction of gravity. For instance, the vehicle mass detection system 202 may match axes of the mobile device 212 with the reference frame of the vehicle by comparing similar sensor data values collected from the sensors 210 and the sensors 214. It will be appreciated that other methods known in the art for aligning axes for sensor data collected from a mobile device and a vehicle may be used.

At step 410 the sensor data is processed using frequency analysis to obtain frequency domain sensor data. In some examples, processing the sensor data may include transforming sensor data varying as a function of time into sensor data varying as a function of frequency (e.g., a Fourier transform, a Laplace transform, a spectral density computation, and the like). In some examples, processing the sensor data may include obtaining a mean crossing frequency of the acceleration data. Processing the sensor data may include determining a change in resonant frequency of the vehicle between a first time stamp and a second time stamp during the first window of time. Determining a change in resonant frequency of the vehicle may include determining a resonant frequency of the vehicle before a vehicle stop and determining a resonant frequency of the vehicle after the vehicle stop. In some examples, processing the sensor data may include determining a change in transfer function between the vehicle and the road.

In some examples, the vehicle may be approximated as a mass and spring to obtain a primary (or simplest) mode of the vehicle. One or more complex resonant modes of the vehicle may also be determined, e.g., using more complex vehicle approximations, to detect changes associated with the vehicle. Using the mass and spring approximation, the natural resonant frequency of the vehicle is a function of the square root of the mass ratio. Accordingly, the amount by which the vehicle mass has changed may be determined based on the following equation:

$$\frac{f2}{f1} \propto \sqrt{\frac{m1}{m2}}.$$

In some examples, a baseline mass of the vehicle may be detected or determined, where the baseline mass of the vehicle relates to a mass of the vehicle with or without passengers. The baseline mass may be determined based a type of vehicle or a make and model of the vehicle. In some examples, the baseline mass may be determined based on sensor data received at a start of a drive, e.g., upon confirmation from the driver that no passengers or packages are present in the vehicle. In that regard, a resonant frequency associated with the baseline mass of the vehicle may be detected from sensor data received upon verification of a baseline mass condition of the vehicle.

In some examples, analyzing the frequency domain sensor data may include detecting a peak signal in a predefined frequency range (e.g., a frequency range of a primary mode of the resonant frequency of the vehicle) at various time intervals during the first window of time. In some examples, analyzing the frequency domain sensor data may include detecting a peak signal in a most powerful area of the frequency spectrum. For example, in an automobile, a primary mode of the resonant frequency may be around 1 Hz. Accordingly, various peak signals from the sensor data may be detected around the 1 Hz range to determine if a change in resonant frequency has occurred that is indicative of a change in mass of the vehicle, e.g., a change in mass of the vehicle above a certain threshold. Processing the sensor data at step 410 may include applying a low pass filter around 1 Hertz.

Referring back to FIG. 3, the sensor data processing module 304 may process the raw sensor data collected by the sensor data collection module 302. For instance, the sensor data processing module 304 may partition the sensor data into windows of time. The window of time may be a predefined duration of time (e.g., a 5-second window, a 10-second window, etc.) with a start time and an end time. Within a particular window of time, the sensor data processing module 304 may perform a data smoothing algorithm to remove noise and duplicate values. The sensor data processing module 304 may identify a duplicate data point by comparing a first data point with a second data point that immediately follows the first data point. Where the first data point has the same value and/or is within a predetermined threshold of the second data point (e.g., within 1% of, within 2% of, etc.), the sensor data processing module 304 may flag the second data point as a duplicate data point. Data points flagged as duplicate data points may be removed by the sensor data processing module 304 using the data smoothing algorithm. In some arrangements, this may be performed by replacing the duplicate data point with an average value of the data point immediately before it (a second data point that immediately precedes the duplicate data point) and the data point immediately after it (a third data point that immediately follows the duplicate data point). The smoothed data may be used by the classification machine learning algorithms in addition to or instead of the raw and derived sensor described above.

In some examples, the sensor data processing module 304 may generate a new set of sensor data with a further smoothing and processing of the raw sensor data. For example, where the sensor data collection module 302 collects every other data point to generate the raw sensor data, the sensor data processing module 304 may generate a new set of sensor data based on every fourth data point of the raw sensor data. The generated set of sensor data with a reduced data point frequency may be used in addition to or instead of the raw sensor data collected by the sensor data processing module 304. Thus, the vehicle mass detection system 202 may ultimately determine whether a vehicle mass change event has occurred based on one or more sets of sensor data, where the one or more sets of sensor data may be based on different data point collection frequencies.

Now referring to FIG. 4, at step 415, the frequency domain sensor data is analyzed to identify one or more occurrences of a vehicle mass change event. In some examples, a vehicle mass change event may be identified based on a change in resonant frequency of the vehicle above a certain threshold. Where a baseline mass of the vehicle was previously detected, analyzing the frequency domain sensor data may then include determining a change in resonant frequency of the vehicle relative to the resonant frequency associated with the baseline mass of the vehicle. In some examples, identifying the one or more occurrences of a vehicle mass change may including categorizing a vehicle mass change event as indicative of a passenger entry into the vehicle, a passenger exit from the vehicle, a refueling of the vehicle, a package loading into the vehicle, or a package unloading from the vehicle. In some examples, the categorizing may be based, at in least part, on an amount of vehicle mass change (i.e., the amount of mass increase or mass decrease of the vehicle) associated with the vehicle mass change event. In some examples, the one or more sensors may include a first sensor in a first location of the vehicle and a second sensor in a second location of the vehicle, and identifying the one or more vehicle mass changes events may include comparing sensor data of the first sensor to sensor data of the second sensor to determine a relative location of a mass change within the vehicle. In some examples, analyzing the frequency domain sensor data may include accounting for variation in a gradient of the road, driving forces, and/or fuel loading, so as to minimize other factors influencing potential mass changes to the vehicle. In some examples, these factors may be minimized by specifically detecting potential vehicle mass changes based on sensor data immediately before and after a vehicle stop.

Figure 7:
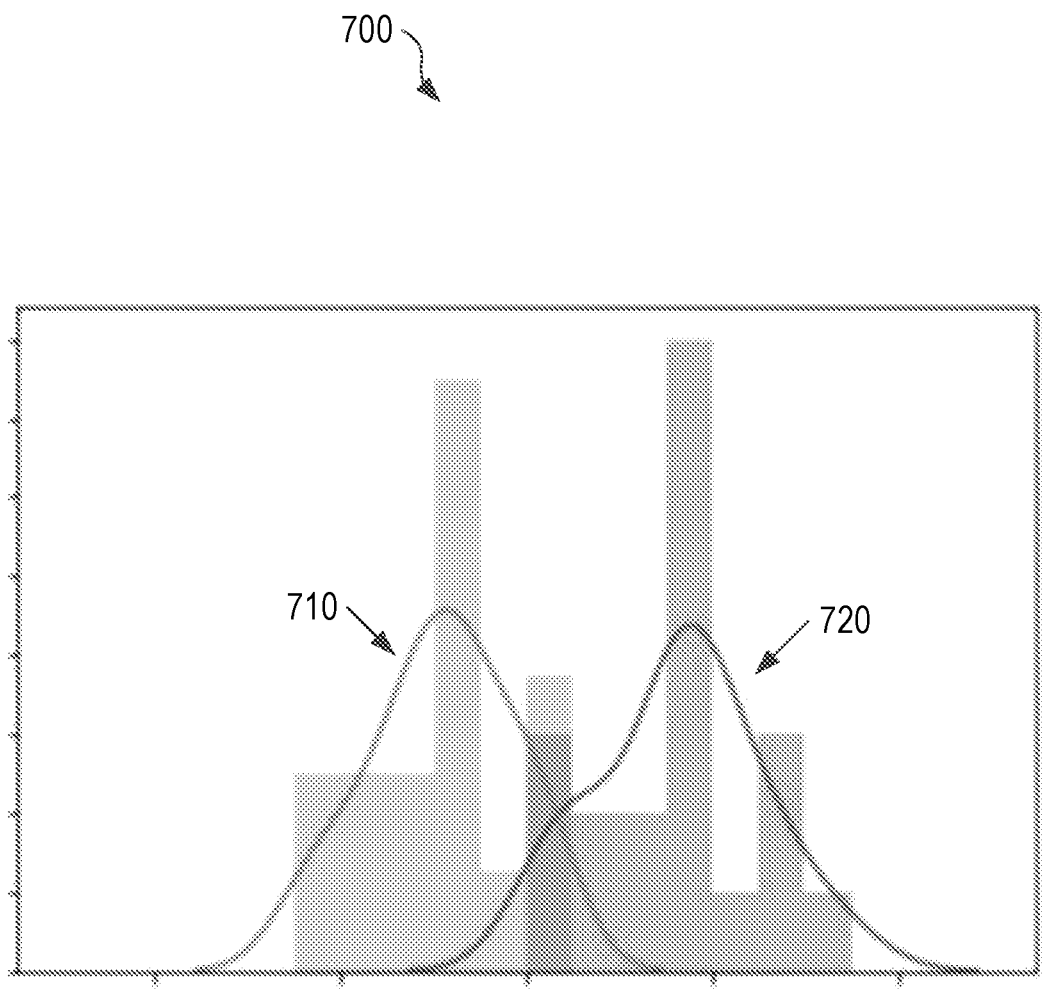
FIG. 7 illustrates a graphical depiction of processed data related to sensed vehicle mass changes, in accordance with one or more aspects described herein.

In step 415, the vehicle mass change classification module 308 may determine whether a particular window of time should be classified as a vehicle mass change event, based, at least in part, on received accelerometer sensor data. Accelerometer sensor data may include raw data collected from the accelerometer 218, as well as derived data (e.g., computations on the raw data) and processed data (e.g., smoothing algorithms on the raw data and/or the derived data and obtaining frequency domain sensor data). The vehicle mass change classification module 308 may apply the classification machine learning algorithms stored in the vehicle mass classification model 322 to classify a window as either a vehicle mass change event or not a vehicle mass change event. As described above, certain features of the accelerometer sensor data may be more indicative of a vehicle mass change event than others. For example, a mean crossing frequency may be calculated using raw data from the accelerometer 218 in determining whether a window of time should be classified as a vehicle mass change event. Other important features may include obtaining frequency domain accelerometer sensor data and determining a change in a peak accelerometer signal in a predefined frequency range, e.g., a frequency range associated with a primary mode of the vehicle. In an example graphical representation shown in FIG. 7, accelerometer data 700 during a window of time may be collected and graphically represented as a differential from a mean or median value. In that regard, instances of single passengers exiting the vehicle may be indicated in the accelerometer data by a shift to the left, represented by curve 710 (e.g., a decrease in the accelerometer data value relative to a mean), whereas instances of single passengers entering the vehicle may be indicated in the accelerometer data by a shift to the right, represented by curve 720 (e.g., an increase in accelerometer data value relative to a mean). In some instance further movements to the right or left in such a graphical representation may be indicative of two or more passengers entering or exiting the vehicle. As such, a relative movement in the processed accelerometer signal by a certain amount may be indicative of a change in passenger presence in the vehicle. It will be appreciated that the various raw data, derived data, and processed data features may be obtained and determined based on the classification machine learning algorithms.

A classification of a vehicle mass change event may indicate that the accelerometer sensor data associated with the window of time is likely a vehicle mass change event. By contrast, a classification of a non-vehicle mass change event may indicate that the accelerometer sensor data associated with the window of time is not likely a vehicle mass change event. In some examples, the vehicle mass change classification module 308 may specify a probability threshold (e.g., 50%, 60%, etc.). As such, if, according to the classification machine learning algorithms, the probability of the sensor data associated with the window of time being a vehicle mass change event is above the probability threshold, the vehicle mass change classification module 308 may classify the window of time as a vehicle mass change event. In contrast, if, according to the classification machine learning algorithms, the probability of the sensor data associated with the window of time being a vehicle mass change event is below the probability threshold, the vehicle mass change classification module 308 may classify the window of time as not a vehicle mass change event. Thus, the precision and recall of the classification machine learning algorithms may be controlled by configuring the vehicle mass change classification module 308 to have a probability threshold. A higher probability threshold may translate to greater precision and lower recall, whereas a lower probability threshold may translate to lower precision and greater recall.

If a window is classified as a non-vehicle mass change event, e.g., as part of step 415, the vehicle mass detection system 202 may return to collecting sensor data at step 405 for a different window of time. As such, the method steps 405, 410, and 415 provided in FIG. 4 may be repeated for different windows of time. For instance, the method steps may be repeated using a sliding window algorithm, such that consecutive windows are overlapping and shifted by one data point. Additionally or alternatively, the method steps may be repeated for consecutive windows such that there is no overlap.

At step 420, one or more vehicle mass change events may be analyzed, e.g., to determine a pattern of use of the vehicle or a type of use of the vehicle. In some examples, GPS data associated with the vehicle may also be received, and the GPS data may be analyzed in combination with the sensor data received at step 405 to determine geo-locations of the vehicle at start points and stop points (e.g., points on a route where the vehicle makes a stop) during the first window of time. Classifying the use of the vehicle may be based in part on analyzing the GPS data in combination with the sensor data to include geo-locations associated with vehicle mass change events. In some examples, the GPS data may verify that the vehicle starts and stops at a home location, and may verify other stop locations along of route. In some examples, the sensor data collection module 302 may determine a geo-location of the vehicle 204 based on information from the GPS receiver 216. The sensor data collection module 302 may also provide a number of other parameters associated with the vehicle. For instance, the sensor data collection module 302 may request the current speed of the vehicle 204 from the mobile device 212, which may in turn request the current speed of the vehicle from the GPS receiver 216. In some examples, the current speed of the vehicle may be an average speed based on multiple requests to the GPS receiver 216 (e.g., an average speed of the vehicle 204 over the last 30 seconds, over the last minute, etc.). In some examples, the sensor data collection module 302 may collect traffic and weather related data within a threshold radius of the vehicle 204. In some examples, traffic related data may be collected for a first threshold radius, and weather related data may be collected for a second threshold radius, such that the first threshold radius is smaller than the second threshold radius. As described above, the mobile device 212 may be in signal communication with external traffic databases and external weather databases. Thus, the mobile device 212 may retrieve traffic and weather related data from the external traffic databases and external weather databases based on a location (e.g., coordinate) retrieved from the GPS receiver 216. Such speed, traffic, and/or weather related data may be used and analyzed in combination with the sensor data received at step 405 for further consideration regarding determining a pattern of use of the vehicle, e.g., where frequent vehicle stops were detected but mass change occurrences of the vehicle 204 were not detected at such stops, traffic data may be provided, e.g., as verification that the frequent stops were to accommodate heavy traffic rather that a shared mobility service use. It will be appreciated that additional or alternative parameter may be obtained from the sensor data collection module 302 for additional data that may be analyzed in conjunction with accelerometer data.

At step 425, a use of the vehicle during the one or more time periods of the first window of time may be classified as a shared mobility service use based on analyzing the one or more vehicle mass change events. Determining a pattern of use of the vehicle may include determining a shared mobility service use of the vehicle based on analyzing a series of the sensed vehicle stops and one or more vehicle mass changes associated with the series of sensed vehicle stops during the first window of time. In some examples, determining a shared mobility service use of the vehicle may be further based on analyzing a duration of each of the series of sensed vehicle stops. In some examples, determining a shared mobility service use of the vehicle may include differentiating between a vehicle stop and a vehicle park. Determining a pattern of use of the vehicle may include determining a home location associated with the vehicle, and determining a route of the vehicle between leaving and returning to the home location.

Still referring to FIG. 4, if a window is classified as a shared mobility service use of the vehicle at step 425, the shared mobility service notification module 310 may generate and/or issue a notification (e.g., a visual notification, an audio notification, etc.) an external computing device regarding the shared mobility service use at step 430. An external computing device may be a computing device affiliated or part of insurance system 244. An external computing device may be an enterprise system affiliated with an owner or named insured of the vehicle. In some examples, the shared mobility service notification module 310 may broadcast a notification of the shared mobility service use on a publicly-accessible server, such that computing devices periodically access the server for shared mobility service uses. Accordingly, the notification on the server may be associated with the vehicle 204, an owner of the vehicle 204, a named insured of the vehicle 204, a driver of the vehicle 204, and the like. In other examples, the shared mobility service notification module 310 may notify one or more other computing devices using short-range communication protocols, such as WLAN, Bluetooth, CALM, or via short-range vehicle communication systems. The notification may include displaying a message on a display on the computing device. Additionally or alternatively, the notification may include emitting a sound on the computing device. In these examples, the notification may also include further details regarding the shared mobility service use, such as the relevant windows of time, classification of vehicle mass changes detected, locations associated with the vehicle mass changes, and the like.

At step 430, a notification relating to the use of the vehicle for a shared mobility service use may be transmitted to a remote computing device, such as a device affiliated with an insurance entity. The notification may include a description of the shared mobility service use, such as a type of share mobility service, based on categorizing the one or more occurrences of a vehicle mass change event. The notification may include a summary of vehicle usage during the first window of time. The summary may include description of one or more vehicle mass change events and one or more detected shared mobility service uses of the vehicle.

The method steps provided in FIG. 4 may be repeated for different windows of time. For instance, the method steps may be repeated using a sliding window algorithm, such that consecutive windows are overlapping and shifted by one data point. Additionally or alternatively, the method steps may be repeated for consecutive windows such that there is no overlap.

The above steps may be accomplished via an apparatus that includes one or more sensors configured to measure on acceleration of a vehicle, one or more processor, and memory storing instructions that, when executed by the one or more processors, cause the apparatus to perform at least some of the above-described steps. In some examples, the one or more sensors may form a part of a sensor system for measuring, collecting, and transmitting sensor data associated with the vehicle.

The above steps may be accomplished via a system that includes a first computing device and a second computing device. The first computing device may be associated with (e.g., positioned within) a vehicle, and may include a processor, at least one sensor configured to measure a vehicle characteristic (e.g., acceleration) during operation of the vehicle, a wireless communication interface, and memory storing instructions that, when executed by the one or more processors, cause the first computing device to measure, using the at least one sensor, the vehicle characteristic. The second computing device may be in signal communication with the first computing device, wherein the second device may include a processor, and memory storing instructions that, when executed by the processor, cause the computing device to: receive, from the first computing device and for a first window of time, sensor data associated with the acceleration of the vehicle, process the sensor data to obtain frequency domain sensor data, analyze the frequency domain sensor data to identify one or more occurrences of a vehicle mass change event, classify a use of the vehicle for a shared mobility service during one or more time periods of the first window of time based on analyzing the one or more occurrence of a vehicle mass change, and display a notification based on classifying a use of the vehicle for a shared mobility service during one or more time periods of the first window of time.

Figure 5:
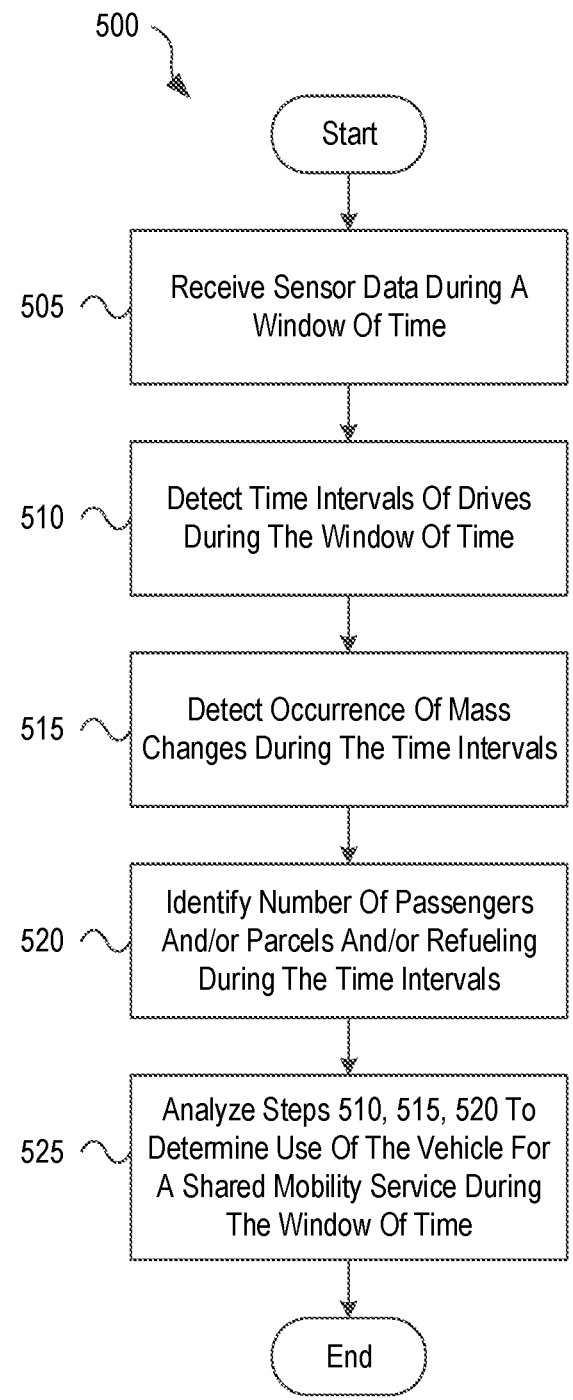
FIG. 5 is a flowchart of example method steps for determining a shared mobility service during a window of time, in accordance with one or more aspects described herein.
Figure 8:
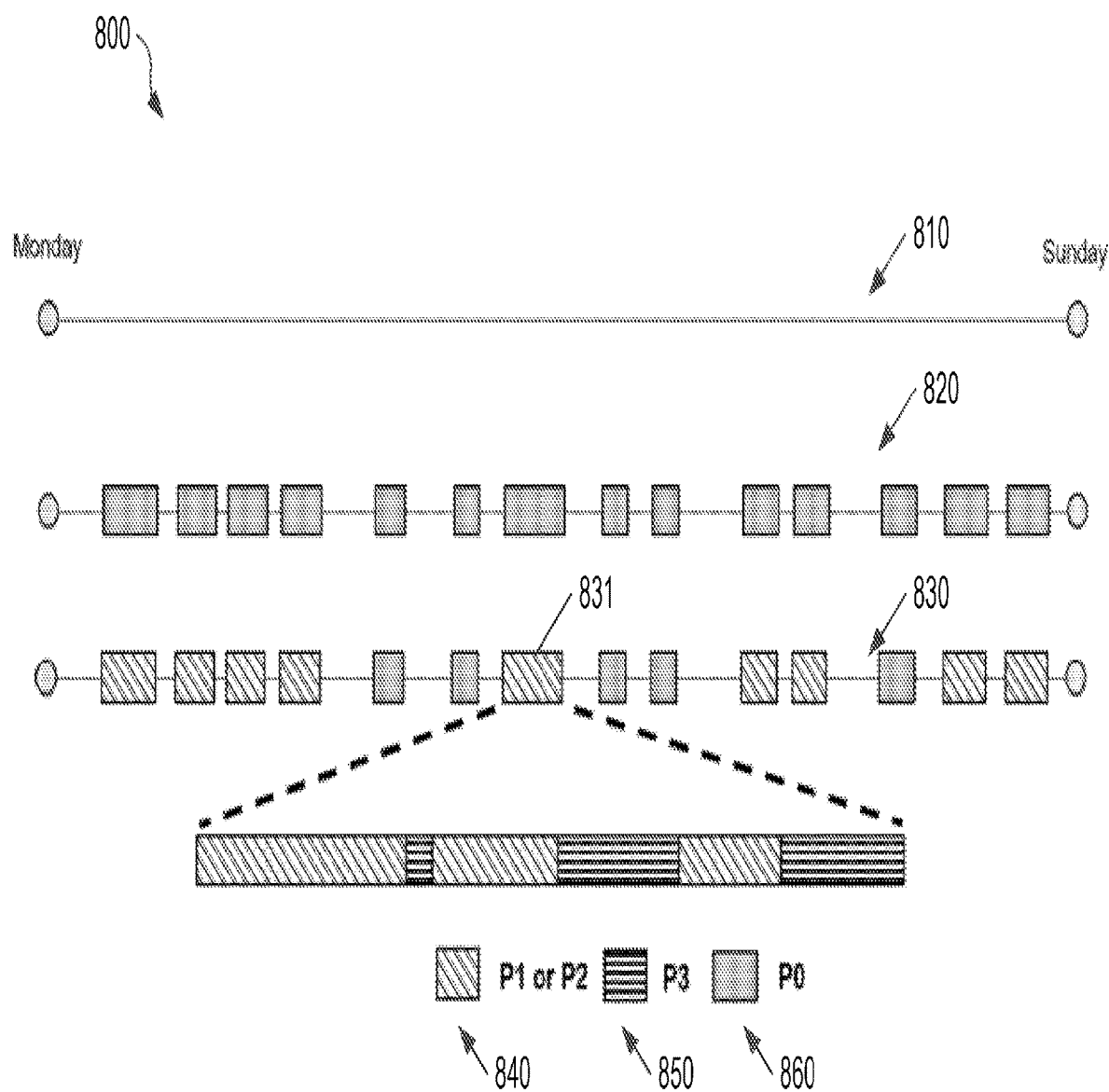
FIG. 8 illustrates a graphical depiction of driving intervals during a window of time and sensed vehicle passengers during the driving intervals, in accordance with one or more aspects described herein.

Referring now to FIG. 5 is a flowchart 500 of example steps for receiving and analyzing vehicle sensor data, detecting one or more vehicle mass change events, and determining a shared mobility service during a window of time. FIG. 8 illustrates of a graphical depiction of sensed driving intervals during a window of time and sensed vehicle passengers during the sensed driving intervals, e.g., determined based on the steps of flowchart 500. The vehicle mass detection system 202 and/or the vehicle mass change detection unit 230 and/or the vehicle mass change detection unit 208 may be used to perform these method steps of flowchart 500. At step 505, sensor data associated with an acceleration of a vehicle may be collected or received via one or more sensors and during a first window of time. In some examples, the sensor data may be similar to or the same as the sensor data received at step 405 of FIG. 4.

At step 510, driving time intervals associated with vehicle drives or operation during the window of time may be detected. For example, as shown in the drive summary 800 of FIG. 8, a window of time 810 from a Monday to a Sunday is depicted. A drive line 820 graphically represents drives by the vehicle during the window of time 810, such as the driving time intervals detected at step 510. More specifically, the drive line 820 is shown as a timeline with one or more blocks representing time intervals during which the vehicle was driven during the window of time. At step 515, one or more occurrences of vehicle mass changes may be detected during the driving time intervals. Detecting vehicle mass changes may include processing the sensor data to obtain frequency domain sensor data and analyzing the frequency domain sensor data, as described above.

At step 520, the one or more occurrences of vehicle mass changes during the driving time interval may be analyzed to identify a number of passengers in the vehicle at various time intervals, an amount of parcels in the vehicle at various time intervals, and/or refueling of the vehicle during the driving time interval. In some examples, the classification machine learning algorithms may also classify a number of passengers in the vehicle at a given time. For example, as shown in FIG. 8, a passenger detection line 830 graphically illustrates drives as being with or without passengers, where drives without passengers are shown as solid blocks and drives with passengers are shown as hatched blocks. Still further analysis may be provided for each of the passenger drive block of passenger detection line. For example, during one drive block 831, the drive may include time intervals with one or two passengers 840, time intervals with three (or more) passengers 850, and/or drive intervals with no passengers 860. At step 525, based on identifying the number of passengers and/or parcels and/or refueling instances during the window of time, a use of the vehicle for a shared mobility service may be determined during one or more time intervals. For examples, drive block 831 may be determined to be associated with a shared mobility use of the vehicle based on the number of passengers changes during the drive, and the number of time of vehicle has one, two, or three passengers. As another example, if a drive block is associated with no passenger change (and no other vehicle mass change events), that drive block may be associated with a personal vehicle use (a non-shared mobility use).

Accordingly, analysis of the pattern of vehicle mass changes, such as passenger changes from one or two passengers to three passengers and/or with intervals of no passengers there between step 525 may be determinative of a shared mobility service use of the vehicle. For example, step 525 may include analyzing whether a number of drives within a time range include varying different numbers of passengers within the vehicle. Similar to step 430 of method 400, a notification based of a shared mobility service use may be transmitted to a remote computing device upon completion of step 525. The notification may include details similar to drive summary 800 of FIG. 8. In some examples, a vehicle or driver's insurance information may be retrieved from the driver information database 324 and/or vehicle information database 326.

The various components of the vehicle mass detection system 202 and/or the vehicle mass change detection unit 208 of the vehicle 204 and/or the vehicle mass change detection unit 230 of the mobile device 212 may be used to perform the above-described method steps. In step 405, the sensor data collection module 302 may receive raw sensor data during a window of time (or from a window of time) from the one or more sensors 214 installed at, attached to, and/or remotely located relative to the mobile device 212 and/or sensors 210 installed in and/or attached to vehicle 204. In some examples, the mobile device 212 may collect sensor data from the one or more sensors 214 and transmit the sensor data to the vehicle mass detection system 202 in real-time. As such, the mobile device 212 may broadcast the sensor data to the vehicle mass detection system 202. In other examples, the mobile device 212 may collect the sensor data from the one or more sensors 214, transmit the sensor data to the vehicle mass change detection unit 230 in real-time, and the vehicle mass change detection unit 230 may transmit the sensor data to the vehicle mass detection system 202. The vehicle mass change detection unit 230 may or may not transmit the sensor data to the vehicle mass detection system 202 in real-time. For instance, the vehicle mass change detection unit 230 may begin to collect sensor data from the one or more sensors 214 at the start of a window of time and wait to transmit sensor data from the one or more sensors 214 until the end of the window of time. In another example, the vehicle mass change detection unit 230 may collect sensor data and determine where the change in the acceleration signal is above a predefined threshold. In this example, the vehicle mass change detection unit 230 may only transmit the sensor data to the vehicle mass detection system 202 where the change in acceleration is above the predefined threshold. The vehicle mass change detection unit 230 may collect raw sensor data, including data relating to a vertical acceleration signal of the vehicle 204. The vehicle mass change detection unit 230 may determine whether the change in the vertical acceleration signal is above a predetermined threshold (e.g., whether a change in an amplitude of the frequency domain sensor data is above a predetermined threshold around a frequency range associated with the resonant frequency of the vehicle). Where the change in the peak acceleration signal of the frequency domain sensor data is above the predefined threshold, the vehicle mass change detection unit 230 may transmit the raw sensor data collected during a window of time to the vehicle mass detection system 202 for further processing and analysis. Alternatively, where the change in the peak acceleration signal of the frequency domain sensor data is not above the predefined threshold, the vehicle mass change detection unit 230 may continue collecting raw sensor data, and in at least some instance, may not transmit the previously collected raw sensor data to the vehicle mass detection system 202. As such, in these examples, the vehicle mass change detection unit 230 advantageously limits and/or controls the number of transmissions between the mobile device 212 and/or the vehicle 204 and the vehicle mass detection system 202. In yet other examples, the vehicle mass change detection unit 230 may transmit sensor data to the vehicle mass detection system 202 in response to a request from the vehicle mass detection system 202 to collect and transmit data during a window of time.

Referring back to FIG. 2, examples of sensor data collected from the sensors 214 of the mobile device 212 may include location from the GPS receiver 216, acceleration from the accelerometer 218, rotational motion from the gyroscope 220, sound from the microphone 222, movement from the camera 224, and magnetization from the magnetometer 226. Examples of sensor data derived from the data collected from the sensors 214 of the mobile device 212 may include minimum acceleration, total acceleration, variance in acceleration, a vertical component of acceleration, components of acceleration relating to pitch, roll, and/or yaw of the vehicle, median acceleration, and indicators of whether a change in a peak acceleration signal is above a predefined threshold. The derived data may be used by the classification machine learning algorithms to determine whether or not a vehicle mass change event occurred within a window of time. In some examples, the features may have different levels of importance, such that some features are more indicative of a likely vehicle mass change event than others.

In some arrangements, the vehicle mass detection system 202 may specify a frequency by which raw sensor data is collected from sensors 214 and/or sensors 210. The frequency by which raw sensor data is collected may control the number of data points requested during a window of time. For instance, every data point (e.g., consecutive data points) may be collected from sensors 214 and/or sensor 210. In another instance, less than every data point (e.g., every other data point or every third data point) may be collected from sensors 214 and/or sensors 210. In some examples, the vehicle mass detection system 202 may advantageously adjust the frequency for collecting sensor data from sensors 214 and/or sensor 210. Additionally or alternatively, the mobile device 212, the vehicle mass change detection unit 208, and/or the vehicle mass change detection unit 230 may be configured to collect data from sensors 214 and/or sensors 210 at a frequency specified by the sensor data collection module 302.

In some instances, reducing the frequency by which raw sensor data is collected may advantageously reduce the power consumption of devices associated with the method of detecting vehicle mass change events, and also may advantageously increase the accuracy of the sensor data and/or analysis of the sensor data. For example, by collecting every second (or third, etc.) data point from sensors 214, the vehicle mass detection system 202 may advantageously conserve the mobile device's 212 limited resources (e.g., battery life), since collecting data from sensor 214 may be a power-intensive process. Further, by collecting every second (or third, etc.) data point, the vehicle mass detection system 202 may also advantageously eliminate noise and/or anomalies in the data stream, e.g., resulting from constant movement of the mobile device 212 within the vehicle 204 or other sensor anomalies. The elimination of noise and/or anomalies in this an early step, such as 405 or step 505 of the method illustrated in respective FIGS. 4 and 5, may also reduce the amount of data processing undertaken a part of subsequent steps 410 and 515. It will be appreciated that the vehicle mass detection system 202 may additionally or alternatively adjust the frequency for collecting data from sensors 214, separate from the frequency set for collecting data from sensors 210.

Figure 9:
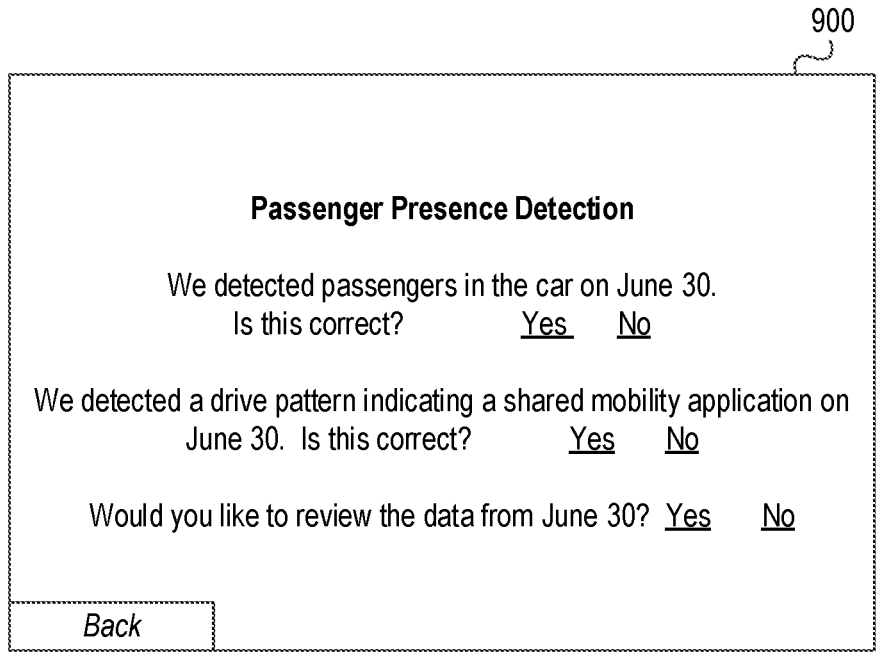
FIGS. 9-10 illustrate exemplary shared mobility application interfaces in accordance with one or more aspects described herein.

FIG. 9 illustrates an example user interface 900 that vehicle mass analysis system 100 may cause to present, e.g., on a display of user device 150. The user interface 900 may include one or more indications of detection of passengers and/or detections of a shared mobility application by the vehicle mass analysis system 100. For example, as illustrated the user interface may indicate that passengers were detected in the vehicle on a certain date and/or during a certain time interval. Additionally or alternatively, the user interface may indicate that a detected driving pattern indicated a shared mobility application on a certain date and/or during a certain time interval. A user of the user device 150 (e.g., the vehicle owner) may indicate whether one or more presented detections are correct or not. In that regard, the user interface may provide selectable links for a user to confirm whether the information provided on the user interface is correct or not. If the user does confirm the information (e.g., if the user selects "Yes" responsive to the displayed "We detected passengers in the car on June 30. Is this correct?" and/or "We detected a drive pattern indicating a shared mobility application on June 30. Is this correct?"). Upon receipt of a user selection confirming that one or more components of information are correct, vehicle mass analysis system 100 may transmit the drive information to one or more other entities, such as an insurance entity or a shared mobility service entity. Upon receipt of a user selection indicating that one or more components of information is not correct, vehicle mass analysis system 100 may undertake further analysis of the relevant information, may flag the relevant information for further review by a server administrator, and/or may make one or more setting adjustments to vehicle mass analysis system 100 relating to detections of vehicle mass change events, passenger change events, and the like. User interface 900 may also allow a user to select to review data from a specific window of time (e.g., "Would you like to review the data from June 30?") to allow the user to view additional data relating to dive data during the window of time, e.g., similar to drive summary 800 of FIG. 8. In some embodiments, the user interface 900 may only be displayed if detected information conflicts with one or more settings for the vehicle and/or the driver, e.g., if the owner of the vehicle has certified that the vehicle is not used to shared mobility services and a share mobility service use is subsequently detected. Additionally or alternatively, in some examples, the driver may manually enter a number of passengers and/or a use of the vehicle via an input device of mobile computing device 170.

Figure 10:
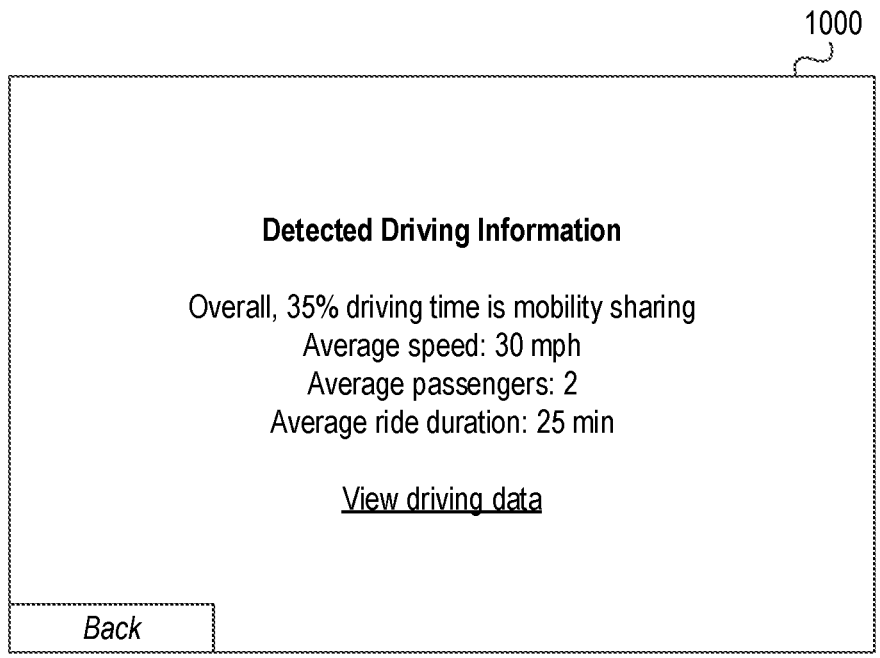

FIG. 10 illustrates an example user interface 1000 for displaying driver summary information (e.g., via a display of user device 150). As illustrated, the user interface 1000 may include various metric associated with drive data of a vehicle, such as average vehicle speed, average number of passengers, average ride duration, percentage of driving time for mobility sharing applications, and the like. The user interface 1000 may further include indications of one or more additional variables that may be used in determining whether a drive interval is associated with a shared mobility application. User interface 900 may also allow a user to select to review drive data (e.g., "View drive data") to allow the user to view additional data relating to dive data during a window of time, e.g., similar to drive summary 800 of FIG. 8.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. An apparatus comprising:
   one or more sensors configured to measure sensor data associated with a vehicle;
   one or more communication circuits for wireless communication;
   one or more processors; and
   memory storing computer-readable instructions that, when executed by the one or more processors, cause the apparatus to:
   collect, via the one or more sensors and during a first window of time, the sensor data associated with the vehicle, and the sensor data including first acceleration data;
   receive, via one or more sensors of a device that is remote from the vehicle, second acceleration data;
   when an amount of noise in the second acceleration data is below a threshold, analyze the second acceleration data to identify one or more vehicle mass change events;
   when the amount of noise in the second acceleration data is above the threshold, analyze the first acceleration data to identify one or more vehicle mass change events;
   classify a use of the vehicle during one or more time periods of the first window of time based on the one or more vehicle mass change events; and
   transmit, to a remote computing device, a notification relating to the use of the vehicle.

2. The apparatus of claim 1, wherein the acceleration data collected via the device that is remote from the vehicle is related to position or movement of the vehicle.

3. The apparatus of claim 1, wherein the memory stores additional computer-readable instructions that, when executed by the one or more processors, further cause the apparatus to:
   classify a load of the vehicle for each of the one or more time periods.

4. The apparatus of claim 1, wherein the memory stores additional computer-readable instructions that, when executed by the one or more processors, further cause the apparatus to:
   determine a change in transfer function at a first time corresponding to a mass of the vehicle.

5. The apparatus of claim 4, wherein the change in the transfer function is based on a mass difference between a calibration time associated with an unloaded state and the first time.

6. The apparatus of claim 1, wherein the memory stores additional computer-readable instructions that, when executed by the one or more processors, further cause the apparatus to:
   transmit information to an external device, wherein the information includes a request to identify the one or more vehicle mass change events; and
   receive a response from the external device identifying information pertaining to the one or more vehicle mass change events.

7. The apparatus of claim 1, wherein the memory stores additional computer-readable instructions that, when executed by the one or more processors, further cause the apparatus to:
   collect vehicle motion information from additional sensors integral into the vehicle.

8. The apparatus of claim 7, wherein the memory stores additional computer-readable instructions that, when executed by the one or more processors, further cause the apparatus to:
   collect subsystem information from additional components integral into the vehicle.

9. The apparatus of claim 7, wherein the use of the vehicle include a business classification or a personal classification.

10. The apparatus of claim 7, wherein the memory stores additional computer-readable instructions that, when executed by the one or more processors, further cause the apparatus to:
    transmit, to the remote computing device, information recorded relating to vehicle operation based on the use of the vehicle corresponding to a shared mobility service.

11. A method comprising:
    collecting, via one or more sensors and during a first window of time, sensor data associated with a vehicle, the sensor data including first acceleration data;
    receiving, via one or more sensors of a device that is remote from the vehicle, second acceleration data;
    when an amount of noise in the second acceleration data is below a threshold, analyzing, using one or more processors, the second acceleration data to identify one or more vehicle mass change events;
    when the amount of noise in the second acceleration data is above the threshold, analyze the first acceleration data to identify one or more vehicle mass change events;

classifying a use of the vehicle during one or more time periods of the first window of time based on the one or more vehicle mass change events; and transmitting, to a remote computing device, a notification relating to the use of the vehicle.

12. The method of claim 11, wherein the acceleration data collected via the device that is remote from the vehicle is related to position or movement of the vehicle.

13. The method of claim 11, further comprising:

classifying a load of the vehicle for each of the one or more time periods.

14. The method of claim 11, further comprising:

determining a change in transfer function at a first time corresponding to a mass of the vehicle.

15. The method of claim 14, wherein the change in the transfer function is based on a mass difference between a calibration time associated with an unloaded state and the first time.

16. The method of claim 11, further comprising:

transmitting information to an external device, wherein the information includes a request to identify the one or more vehicle mass change events; and receiving a response from the external device identifying information pertaining to the one or more vehicle mass change events.

17. The method of claim 11, further comprising:

collecting vehicle motion information from additional sensors integral into the vehicle.

18. The method of claim 17, further comprising:

collecting subsystem information from additional components integral into the vehicle.

19. The method of claim 17, wherein the use of the vehicle include a business classification or a personal classification.

20. The method of claim 17, further comprising:

transmitting, to the remote computing device, information recorded relating to vehicle operation based on the use of the vehicle corresponding to a shared mobility service.

* * * * *